(No Model.)

W. H. HARFIELD.
CAPSTAN.

No. 515,935.

Patented Mar. 6, 1894.

Witnesses
B. E. Nebel
Jesse Kingsbury

Inventor
William H. Harfield
Whitaker & Prevost, Attys.

UNITED STATES PATENT OFFICE.

WILLIAM HORATIO HARFIELD, OF LONDON, ENGLAND.

CAPSTAN.

SPECIFICATION forming part of Letters Patent No. 515,935, dated March 6, 1894.

Application filed November 13, 1893. Serial No. 490,822. (No model.) Patented in England January 29, 1885, No. 1,298.

*To all whom it may concern:*

Be it known that I, WILLIAM HORATIO HARFIELD, of Mansion House Buildings, in the city of London, England, have invented certain new and useful Improvements in Capstans, (for which I have obtained a patent in Great Britain, No. 1,298, dated January 29, 1885;) and I do hereby declare that the following is a full, clear, and exact description of the invention, such as will enable others skilled in the art to which it appertains to make and use the same.

This invention consists in the novel features hereinafter fully described reference being had to the accompanying drawings which illustrate one form in which I have contemplated embodying my invention and said invention is fully disclosed in the following description and claims.

Figure 1:
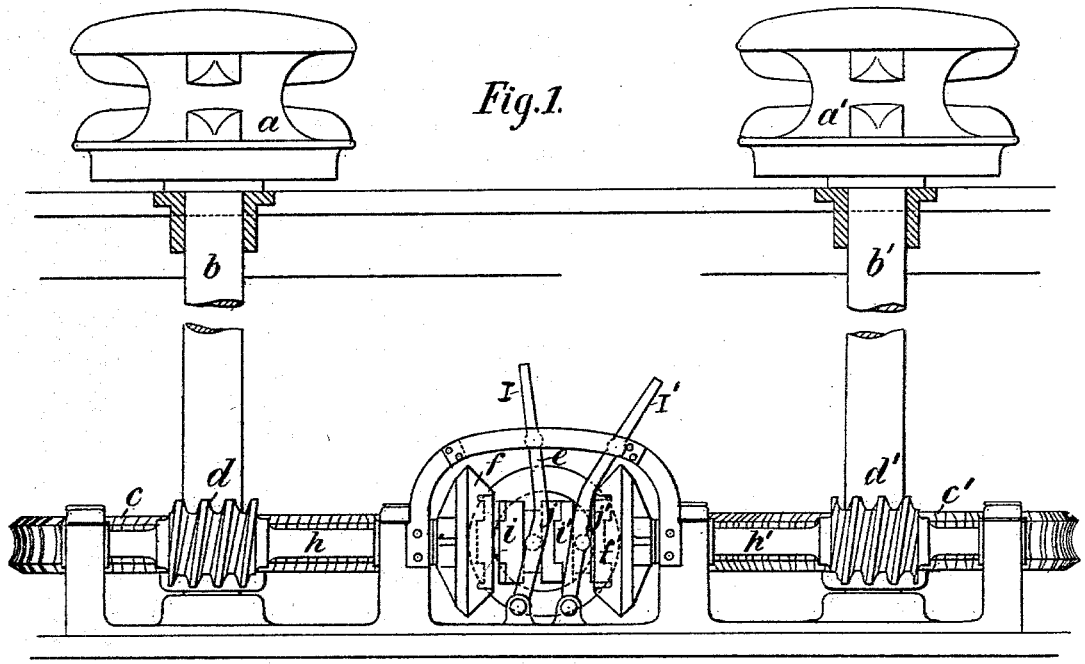
Figure 2:
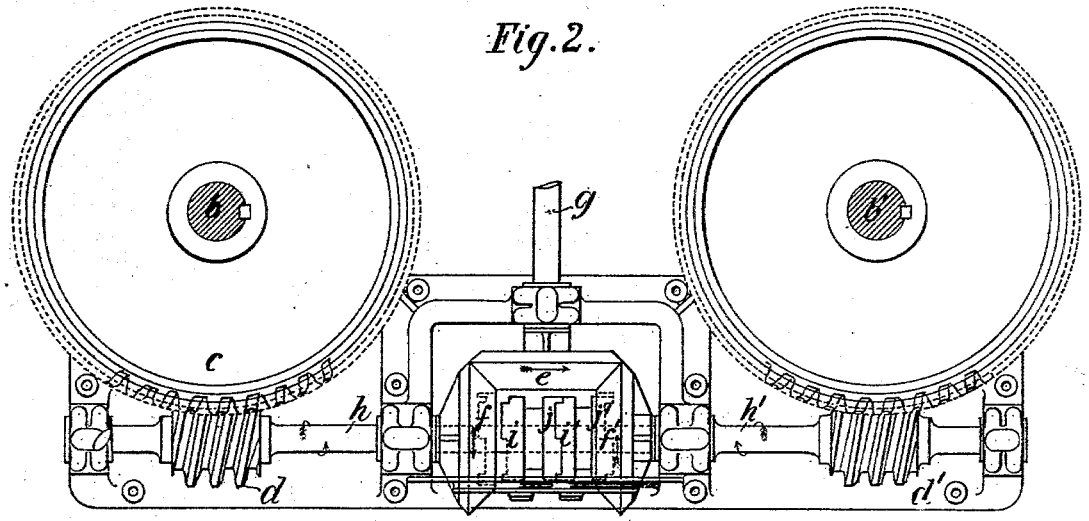

Referring to the drawings, Figure 1 is an elevation partly in section of a pair of capstans provided with my improved gearing, and Fig. 2 is a plan view (partly sectional) of the same.

In the drawings $a\ a'$ represent the usual cable holders mounted upon their spindles $b\ b'$.

$c\ c'$ are worm wheels also mounted upon the spindles $b\ b'$; and $d\ d'$ are worms engaging the worm wheels $c\ c'$ respectively for driving the same. The worms $d\ d'$ are on independent shafts $h\ h'$ respectively supported in bearings in line with each other, the inner ends of said shafts being close together as shown in dotted lines in Fig. 2. On the inner ends of the worm shafts $h\ h'$ are loose miter gears $f$ and $f'$ respectively which engage a miter gear $e$ on a driving shaft $g$, supplied from power from any suitable source. I have shown the miter gears as being friction wheels, but spur gears might be employed if desired. The worm shafts $d\ d'$ are provided each with a double clutch $i\ j$ and $i'\ j'$ respectively as shown which clutches are splined each on its respective shaft and operated by the clutch levers $I\ I'$ respectively as clearly shown in Fig. 1. Each clutch is provided with parts to engage its respective miter gear, and the opposite side of the clutch is provided with parts to engage the clutch on the other shaft and thus connect the two independent shafts for joint movement. It will thus be seen that each clutch can be thrown into engagement with its respective gear, and in this case the two independent shafts will be simultaneously rotated in opposite directions. Or the one of the clutches may be thrown into engagement with its gear and the other clutch thrown over into engagement with the first mentioned clutch, as shown in the drawings, thus coupling the two shafts together and causing them to be simultaneously rotated in the same direction. To rotate both shafts simultaneously in the opposite direction, both clutches are kept in engagement with each other and are thrown over so as to bring the other clutch into engagement with its gear. This construction enables a variety of movements to be imparted to the capstans and the capstans are very easily and readily controlled. Thus one cable may be paid out while another is being hove in or both may be paid out or hove in simultaneously.

What I claim, and desire to secure by Letters Patent, is—

1. The combination, with the driving shaft provided with a driving gear, of a pair of independent capstan operating shafts each provided with a loose gear in engagement with the driving gear, independent clutches for connecting said loose gears with their respective shafts and for clutching the two independent shafts together for joint movement whereby said independent shafts may be rotated in opposite directions or simultaneously in either direction, substantially as described.

2. The combination with the driving shaft provided with a driving gear, of a pair of independent capstan operating shafts, each provided with a loose gear in engagement with the driving gear, independent clutches for connecting said loose gears with their respective shafts, each of said clutches being constructed to engage parts connected with the other shaft, and means for throwing each of said clutches out of engagement with its loose gear and into engagement with the other shaft, substantially as described.

3. The combination with the driving shaft, provided with a driving gear, of two independent worm shafts, each provided with a loose gear in engagement with the driving capstans operatively connected with said independent worm shafts, a double clutch on each shaft having parts for connecting the loose gear with its respective shaft and parts for engaging the other clutch and coupling the two shafts together for joint movement, substantially as described.

WILLIAM HORATIO HARFIELD.

Witnesses:
   JAMES SHORT,
   ALEXANDER BLOCK,
*Clerks with Messrs. Mather, Cockcroft & Co., Solicitors, Mosley Street, Newcastle-on-Tyne.*